No. 816,133. PATENTED MAR. 27, 1906.
W. A. SPEAKMAN.
FAUCET.
APPLICATION FILED MAR. 29, 1904.

2 SHEETS—SHEET 1.

WITNESSES:

INVENTOR:
Willard A. Speakman
by his atty

BEST AVAILABLE COPY

No. 816,133. PATENTED MAR. 27, 1906.
W. A. SPEAKMAN.
FAUCET.
APPLICATION FILED MAR. 29, 1904.

2 SHEETS—SHEET 2.

WITNESSES:

INVENTOR:
Willard A. Speakman
by his atty.

UNITED STATES PATENT OFFICE.

WILLARD A. SPEAKMAN, OF WILMINGTON, DELAWARE.

FAUCET.

No. 816,133.   Specification of Letters Patent.   Patented March 27, 1906.

Application filed March 29, 1904. Serial No. 200,514.

*To all whom it may concern:*

Be it known that I, WILLARD A. SPEAKMAN, a citizen of the United States of America, residing in the city of Wilmington, in the county of Newcastle, in the State of Delaware, have invented a certain new and useful Improvement in Faucets, of which the following is a true and exact description, reference being had to the accompanying drawings, which form a part thereof.

My invention relates to means for controlling and regulating the flow of fluids, and is particularly applicable, though not exclusively so, to faucets, and especially to the kind of faucet known as a "mixing-faucet," generally used in connection with hot and cold water; and the object of my invention is to provide, primarily, an improved means for regulating the flow of fluids and for insuring against leakage when the flow is cut off.

In its broadest feature my invention consists in providing a plug-cock for regulating and shutting off flow and combining with it a valve or valves held to its or their seats by springs and actuated in closing by said springs and in opening by the movements of the plug-cock.

The nature of my improvements will be best understood as described in connection with the drawings, which illustrate a faucet embodying my improvements in what I believe to be their best and most efficient forms, and in which—

Figure 1:
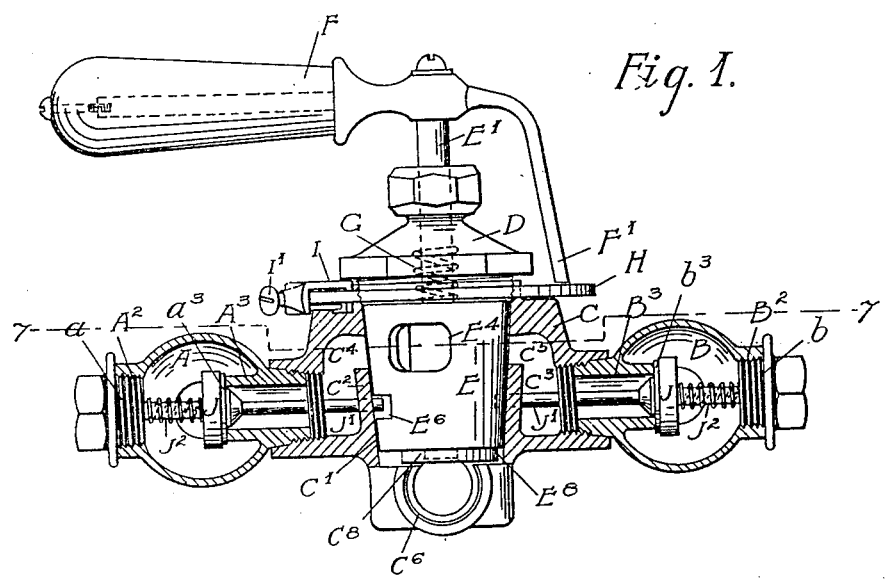
Figure 2:
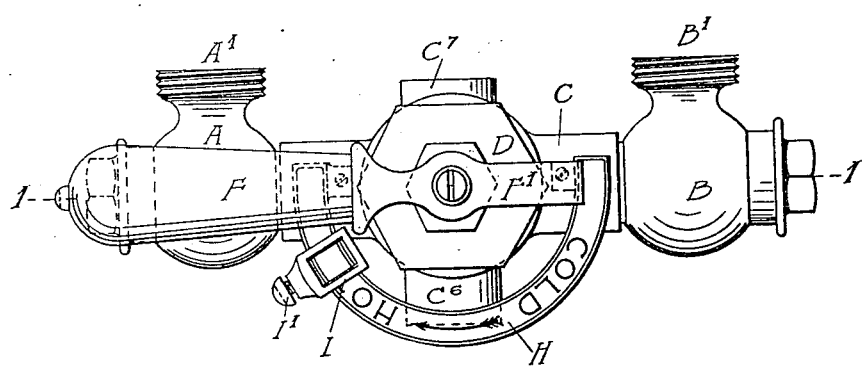
Figure 3:
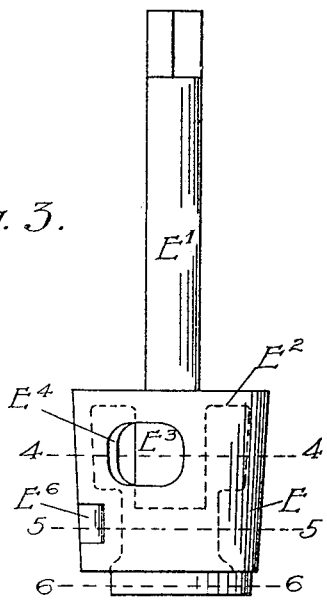
Figure 4:
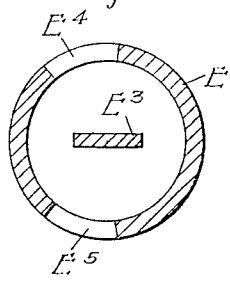
Figure 6:
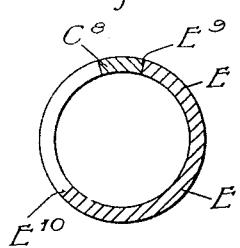
Figure 5:
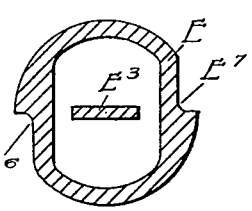
Figure 7:
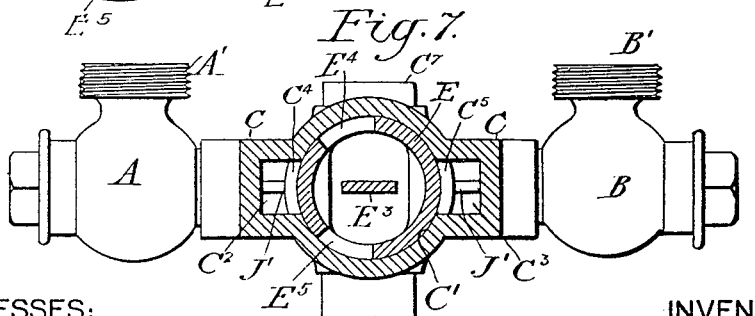

Figure 1 is an elevation of my faucet, showing the casing in vertical section on the line 1 1 of Fig. 2. Fig. 2 is a plan view of the faucet; Fig. 3, an elevation of the plug-cock and connecting-rod shown in Fig. 1, while Figs. 4, 5, and 6 are respectively sections through the plug-cock, taken on the lines 4 4, 5 5, and 6 6 of Fig. 3; and Fig. 7 is a cross-sectional view through the ports, taken on the line 7 7 of Fig. 1.

My faucet, as illustrated, is characterized by having two inlet-ports which are provided with valves by which the ports are opened and closed simultaneously and also provided with other means for opening and closing the ports, whereby both may be simultaneously opened and the opening of either regulated so as to effect the desired mixture in the outflow-passage.

By preference the regulating device is a plug-cock and the general construction as shown in the drawings, although my invention is capable of very material changes in form and arrangement of parts without departure from its spirit.

In the preferred construction illustrated the casing may be said to be made up of the three parts A, B, and C, the parts A and B being formed with inlet-passages A' and B', also with threaded apertures $A^2$ and $B^2$ for the insertion of valves, such passages being closed by screw-caps $a$ and $b$, and the parts A and B having also exit-ports $A^3$ and $B^3$, provided with valve-seats, as shown at $a^3$ and $b^3$. The parts A and B screw into the central body C of the casing, which is formed with a conical cock-seat, (indicated at C',) with ports $C^2$ and $C^3$ communicating with the ports $A^3$ and $B^3$, as shown, and through the walls of the cock-seat at $C^4$ and $C^5$. As shown, the lower portion of the casing C is also provided with exit-ports $C^6$ and $C^7$.

D is the screw-cap of the casing; E, a plug-cock working in the seat C' and having, as shown, a stem E', which extends up through a stuffing-box in the cap D, the stem being formed integral with the top $E^2$ of the hollow plug-cock, from which also extends downward a partition, (indicated at $E^3$,) which intervenes between the ports $E^4$ and $E^5$, formed in the walls of the cock. The plug-cock, as shown, is also formed with cams, (indicated at $E^6$ and $E^7$,) formed in the lower portions of its walls and has a segmental stop-lug $E^8$, the ends of which (indicated at $E^9$ and $E^{10}$) limit the rotative movements of the cock by coming in contact with a stop-lug $C^8$.

F is the handle of the cock, which is fastened to the stem E' and, as shown, provided with a stop and pointer finger F', which moves over the surface of a segmental indicator H, attached to or formed with the casing C.

I is a movable or adjustable stop which can be moved freely to any position on the segment H and clamped in such position, as by means of the set-screw I'.

G is a spring acting to press the plug-cock down in its seat.

J J are valves adapted to seat themselves on the valve-seats $a^3$ and $b^3$ and provided with inwardly-extending rods J' and J', which register with a portion of the cock containing the cams $E^6$ and $E^7$. $J^2 J^2$ are springs which tend to seat the valves J J.

In Fig. 1 the parts are shown in the position they occupy when the faucet is not in use, the valves J J being situated on the entrance-ports and the cock E turned to such a position as to close the port-openings $C^4$ and $C^5$. The first motion of the handle F and cock E brings the cams $E^6$ and $E^7$ into contact with the valve-stems $J'$, forcing the valves J J outward, so as to open the portions of the entrance-ports which these valves have previously closed, and during all other motions of the plug-cock the valves J J remain open until the handle is again returned to the closed position. (Shown in Figs. 1 and 2.) The further opening movement of the plug-cock brings the cock-port $E^4$ into registry with the port-opening $C^4$, which is generally that through which the cold water enters the faucet, the motion of the cock gradually opening this port until when it is opened to the maximum the port $E^5$ of the cock begins to register with the port $C^5$ of the casing, in which the further movement of the cock contracts the opening through the port $C^4$, closing it at or about the time when the port $C^5$ is fully opened. It is generally desirable to fix some automatic stop by which movements of the cock will be arrested at the point where the normal desirable mixture of hot and cold water is secured, and this I accomplish by means of the adjustable stop I and stop-finger $F'$.

The reversed movements of the cock are of course just the reverse of those described for its opening movement, the valves J J remaining open until the cock and handle are turned to closed position.

Aside from other advantages of my constructions it will be noted that I avoid the leaking which is very frequently incident to the use of plug-cocks by providing the independent closing-valves in the inlet-ports, which supplement the cock and close the ports positively when the faucet is not in use.

Having now described my invention, what I claim as new, and desire to secure by Letters Patent, is—

1. A casing having a cock-seat and a valve seat or seats, in combination with a plug-cock working in the cock-seat, a valve or valves adapted to seat themselves on the valve seat or seats aforesaid, springs acting to seat said valves and means actuated by the turning of the plug-cock to open its ports and acting to open the valve or valves and by the turning of the cock to close its ports to release the valve or valves and permit the springs to close them.

2. A casing having communicating ports, a cock-seat interposed in one or more of said ports, and one or more valve-seats also interposed in said ports, in combination with a plug-cock working in the cock-seat, a valve or valves adapted to seat themselves on the valve-seats aforesaid, springs acting to seat said valves, and means actuated by the movement of the cock to open the ports controlled by it operating to open the valves and by the movement of the cock to close its ports to release the valves permitting the springs to close them.

3. A casing having a cock-seat and a valve seat or seats, in combination with a plug-cock working in the cock-seat and having a cam or cams formed on it, a valve or valves adapted to seat themselves on the seat or seats aforesaid, springs acting to seat said valves and valve-rods connected to the valves and extending to a position to be acted on by the cams of the cock.

4. In a faucet, a casing having two fluid-inlet ports leading into it and one or more outlet-ports leading from it, in combination with valves for opening and closing the inlet-ports, means for opening and closing said valves adapted to open and close both practically simultaneously, and other means for opening and closing the inlet-ports whereby both ports may be simultaneously opened and either of them partly or wholly closed.

5. In a faucet, a casing having two fluid-inlet ports leading into it and one or more outlet-ports leading from it, in combination with valves for opening and closing the inlet-ports, means for opening and closing said valves adapted to open and close both practically simultaneously, other means for opening and closing the inlet-ports whereby both ports may be simultaneously opened and either of them partly or wholly closed, and a handle connected with and actuating all the port closing and regulating mechanism as described and so that the simultaneously-acting valves are moved to open the ports in advance of the opening of the ports by the other port opening and regulating devices.

6. In a faucet, a casing having two inlet-ports, a chamber into which said ports lead and one or more outlet-ports leading from said chamber, in combination with valves arranged to open and close said inlet-ports at points in the rear of their opening into the chamber, additional port closing and regulating devices situated in the chamber and whereby the port-openings thereto may be relatively regulated, a handle and means actuated thereby and connected with the valves and other port-regulating devices as described and whereby the valves are first opened and are kept open during the various adjustments of the regulating mechanism.

7. In a faucet, a casing having two inlet-ports, a chamber into which said ports lead and one or more outlet-ports leading from said chamber, in combination with valves arranged to open and close said inlet-ports at points in the rear of their opening into the chamber, a part moving in contact with the walls of the chamber having ports formed in it and arranged to open both ports of the casing to the outlet in varying degree and to close both ports as the port-containing part is moved, means connected with said movable part and actuated thereby whereby the valves of the inlet-port are opened and closed simultaneously, and a handle for shifting the position of the movable part.

8. In a faucet, a casing having a chamber with two inlet-ports leading into it, and one or more outlet-ports leading from said chamber, in combination with valves arranged to open and close said inlet-ports at points in the rear of their opening into the chamber, a part moving in contact with the walls of the chamber having ports formed in it and arranged to open both ports of the casing to the outlet in varying degree and to close both inlet-ports of the chamber as the movable port-containing part is moved, cams connected with said movable part and actuated thereby whereby the valves of the inlet-port are opened and closed simultaneously, and a handle for shifting the position of the movable part.

9. In a faucet, a casing having a chamber with two inlet-ports leading into it, a cock-seat formed on the inner wall of said chamber and one or more outlet-ports leading from said chamber, in combination with valves arranged to open and close said inlet-ports at points in the rear of their opening through the cock-seat into the chamber, a plug-cock seated in the cock-seat and having ports formed in it to open both inlet-ports to the outlet-port in varying degree and to close both ports as the cock is turned, cams moving with the cock and arranged to open and close the valves of the inlet-ports and a handle for turning the cock.

WILLARD A. SPEAKMAN.

Witnesses:
CHAS. F. MYERS.
JOS. BROWN.